United States Patent [19]

Kuppenheimer

[11] 4,191,931
[45] Mar. 4, 1980

[54] COOLED LASER Q-SWITCH

[75] Inventor: John D. Kuppenheimer, Tewksbury, Mass.

[73] Assignee: Sanders Associates, Inc., Nashua, N.H.

[21] Appl. No.: 875,469

[22] Filed: Feb. 6, 1978

[51] Int. Cl.² .............................................. H01S 3/113
[52] U.S. Cl. .......................... 331/94.5 Q; 331/94.5 D
[58] Field of Search ..................... 331/94.5 C, 94.5 Q, 331/94.5 M

[56] References Cited

U.S. PATENT DOCUMENTS

| 3,500,234 | 3/1970 | Goedertier | 331/94.5 Q |
| 3,546,620 | 12/1970 | Erickson et al. | 331/94.5 Q |
| 3,613,024 | 10/1971 | Geusic et al. | 331/94.5 Q |
| 3,660,777 | 5/1972 | Erickson | 331/94.5 Q |
| 4,105,953 | 8/1978 | Jernigan | 331/94.5 Q |

OTHER PUBLICATIONS

Johnson et al., Plastic Q-Switch for Giant Pulse Lasers, IBM Tech. Discl. Bull., vol. 15, No. 8, (Jan. 1973), p. 2619.

Primary Examiner—William L. Sikes
Attorney, Agent, or Firm—Louis Etlinger; Richard I. Seligman

[57] ABSTRACT

In one embodiment, cooling of a laser passive Q-switch is provided by affixing the Q-switch to the rear mirror of the laser which, thus, acts as a heat sink for the Q-switch.

13 Claims, 3 Drawing Figures

COOLED LASER Q-SWITCH

BACKGROUND OF THE INVENTION

This invention relates to lasers and more particularly to Q-switches therefor.

A laser typically comprises a laser medium such as a solid state crystal rod, which is positioned within a resonant cavity formed by a pair of mirrors, one of which is totally reflecting at a desired wavelength of the laser, and the other being partially transmissive at the desired wavelength. A pumping source, such as a zenon flash lamp is employed to raise the atoms in the laser medium from the ground state to an excited state. Lasers often employ a Q-switch therein to suppress the laser action until a large population inversion of excited state atoms in the laser rod has been achieved. Mechanical or electro-optical Q-switches, such as Kerr cells, are frequently employed; however, they are relatively complex and expensive both in terms of the number of component parts and in the manufacturing thereof.

To avoid the expense and complexity of the mechanical or electro-optical Q-switches, the passive Q-switch has been employed. Passive Q-switches can be merely a dye disposed within a liquid or plastic medium. For many applications these conventional passive Q-switches are quite satisfactory. However, the demands have grown for passive Q-switches in lasers which operate at relatively high repetition rates. The peak power generated from such high repetition rate lasers is generally not much different from those of very low repetition rate lasers. However, the average power applied to the passive Q-switch is sufficiently high to cause deformation thereof or even melting.

SUMMARY OF THE INVENTION

Accordingly, it is an object of this invention to provide an improved Q-switch.

It is another object of this invention to provide a Q-switch which is operable at high laser repetition rates.

It is a further object of this invention to provide a cooled Q-switch.

Briefly, in one embodiment an improved Q-switch is provided by depositing a material making up such a Q-switch on the rear mirror of a laser such that the rear mirror acts as a heat sink to absorb much of the heat incident on the Q-switch and thereby preventing the heating up thereof.

BRIEF DESCRIPTION OF THE DRAWINGS

The above-mentioned and other features and objects of this invention will become more apparent by reference to the following description taken in conjunction with the accompanying drawings, in which.

DESCRIPTION OF PREFERRED EMBODIMENTS

Figure 1:
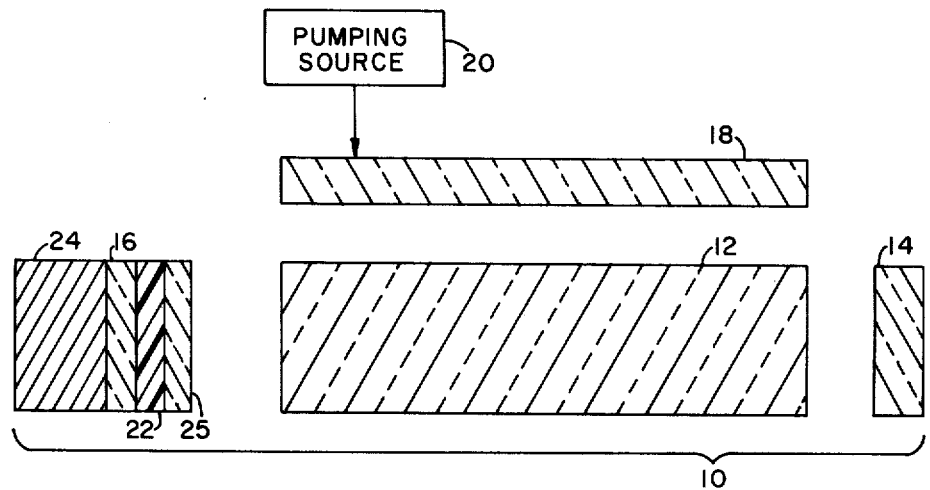
FIG. 1 is a drawing in section of a laser employing a rear mirror Q-switch.

Referring now to FIG. 1 of the drawings, there is illustrated thereby a laser 10 comprising a laser medium 12 bounded by a pair of mirrors 14 and 16 forming a resonant cavity therebetween. A flash lamp 18 driven by a source 20 is used to pump the laser medium 12. While only a single flash lamp is shown, multiple flash lamps can be used as is well known. Mirror 16 is deposited on a substrate 24 and a Q-switch 22 is deposited on mirror 16. The substrate 24 acts as a heat sink for the heat incident on the Q-switch, thus, minimizing the amount of heat absorbed by the Q-switch 22. This permits the laser to be operated at much higher repetition rates than would be the case if no heat sinking was provided for the Q-switch.

In this embodiment as well as other embodiments the relative size of the components are not illustrated to scale but only to aid in understanding the invention. For example, the Q-switch 22 and mirror 16 may be only very thin layers, such as, depositions of appropriate material. An anti-reflection coating 25 may also be used; however, this is not necessary.

In one embodiment of the invention the laser medium 12 includes a Nd:YAG rod. The substrate used is copper. Other typical substrates are sapphire or quartz contacted to a metal, for better cooling, or sapphire or quartz alone. One typical Q-switch comprises a dye, bis(dimenthylaminodithiobenzil)Ni, dissolved in an acrylic plastic, polymethyl methacrylate, both of which are combined with a solvent 1-2 dichloroethane, to form a solution which is deposited on the substrate 24.

While other methods of depositing the Q-switch on a substrate can be employed, the best results have been obtained by a deposition and spinning process. In this method, the plastic is introduced into a clean glass container containing the solvent and placed in an ultrasonic cleaner for a few hours, depending upon the solubility of the plastic. The dye is then introduced and the whole mixture returned to the ultrasonic cleaner for about twenty-four hours. At the end of this time both dye and plastic should be well into solution.

The liquid is then deposited on a clean substrate preferably through filters to eliminate particulate contamination. After such deposition, the substrate is attached to a photo-resist spinner by, for example, a vacuum chuck and the substrate spun. The spin speed and acceleration can be adjusted to control surface flatness and plastic film thickness. Subsequent depositions are made in the same manner with some drying time between successive depositions. Excess plastic which accumulates at the edge of the substrate is trimmed before the plastic is well cured to prevent chipping. This spinning deposition process is desirable for this application since very thin layers having large amounts of dye are obtainable readily permitting heat extraction therefrom.

Preferably the Q-switch 22 and substrate 24 are fixed to the rear mirror 16 of the laser. However, this structure could be affixed to the front mirror instead. In such a configuration employing an opaque substrate the substrate would have to be arranged at the side of the mirror so as not to block emitted radiation.

Figure 2:
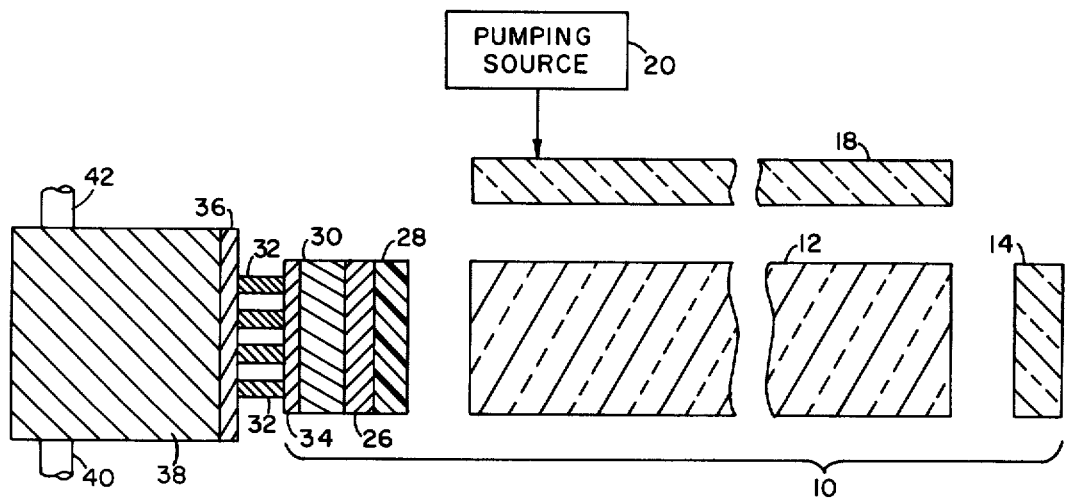
FIG. 2 is a drawing in section of another embodiment of a laser employing a different rear mirror Q-switch.

Another embodiment of a rear mirror Q-switch is shown in FIG. 2 of the drawings. In this embodiment the laser medium 12 is disposed between a pair of mirrors 14 and 26, forming a resonant cavity therebetween. A Q-switch is deposited on mirror 26 which is disposed on substrate 30. Substrate 30 is preferably a material having a high thermal conductivity, such as, copper. The laser in FIG. 2 as described may be employed as described up to this point with only the copper substrate 30 acting as the heat sink for the Q-switch. However, if additional cooling is required, then a plurality of thermoelectric elements 32 may be provided between a hot junction 34 affixed to the substrate 30 and a cold junction 36 having attached thereto another copper heat sink 38 which may have a coolant running through channels therein, which are not shown. The coolant is applied to an inlet 40 and removed via an outlet 42. The channels in the copper heat sink 38 are connected between an input and an output 40 and 42. Again, in this embodiment the Q-switch 28 is preferably affixed to the rear mirror of the laser; however, it may be affixed instead to the front mirror thereof, with the proviso as mentioned above that the means for withdrawing heat not interfere with the outputted radiation.

While one form of cooling is shown for cooling the heat sink, other methods of cooling may be used as, for example, blowing cooling air over the heat sink or providing cooling fins on the heat sink, etc.

Figure 3:
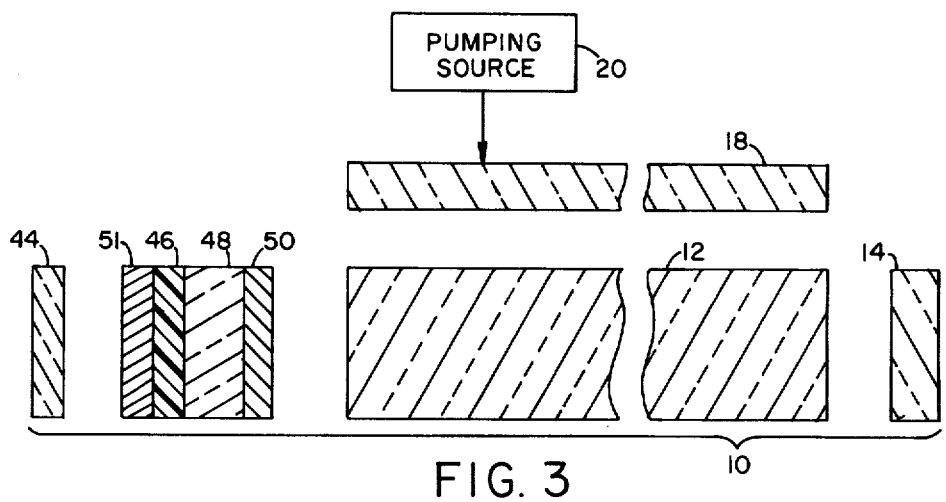
FIG. 3 is a drawing in section of a laser employing a cooled Q-switch.

A further embodiment of the invention is illustrated in FIG. 3 of the drawings. In this embodiment, again, the laser medium is disposed between mirrors to form a resonant cavity, mirror 14 and mirror 44. In this embodiment, however, the Q-switch is not affixed to the rear mirror but rather disposed separately in the cavity. The Q-switch 46 is disposed on a substrate 48 which acts as a heat sink. Sapphire is a preferred material for this substrate. The other end of sapphire substrate 48 has anti-reflection coating 50 disposed thereon. The positions of Q-switch 46 and coating 50 may be reversed. An anti-reflection coating 51 may also be provided on the side of Q-switch 46 nearest mirror 44 in addition to the one shown.

While specific embodiments for cooling a passive Q-switch have been described, it is to be understood that the embodiments shown are illustrative only, and that many variations and modifications may be made without departing from the principles of the invention herein disclosed and defined by the appended claims.

I claim:

1. In a Q-switched laser including a laser medium and a pair of resonators in combination therewith, the improvement comprising a substrate mechanically coupled to one of said resonators and a passive Q-switch mechanically coupled to said substrate to provide good thermal contact between the Q-switch and substrate such that said substrate acts as a heat sink for such Q-switch.

2. The improvement as recited in claim 1, wherein said substrate is selected for the group consisting of:
   copper;
   quartz; and
   sapphire.

3. The improvement as recited in claim 1, wherein said pair of resonators includes a totally reflecting resonator and a partially reflecting resonator, said substrate being coupled to the totally reflecting resonator.

4. The improvement as recited in claim 1, wherein said substrate is a good thermal conducting material.

5. In a Q-switched laser including a laser medium and a pair of resonators in combination therewith, the improvement comprising a substrate mechanically coupled to one of said resonators and a Q-switch mechanically coupled to said substrate to provide good thermal contact between the Q-switch and substrate such that said substrate acts as a heat sink for said Q-switch, said Q-switch comprising a solution of a dye, a plastic, and a solvent which is deposited on said substrate.

6. The improvement as recited in claim 5 wherein said dye is bis(dimethylaminodithiobenzil)Ni.

7. The improvement as recited in claim 5, wherein said plastic is an acrylic plastic.

8. The improvement as recited in claim 7, wherein said acrylic plastic is polymethyl methacrylate.

9. The improvement as recited in claim 5, wherein said solvent is 1-2 dichloroethane.

10. In a Q-switched laser system including a laser medium and a pair of resonators forming a cavity in combination therewith, the improvement comprising a passive Q-switch mechanically coupled to a substrate which acts as a heat sink for said Q-switch, said Q-switch and substrate disposed within said cavity and detached from said resonators.

11. The improvement as recited in claim 10, said substrate having an anti-reflection coating on one surface thereof.

12. In a Q-switched laser including a laser medium and a pair of resonators in combination therewith, the improvement comprising a copper substrate mechanically coupled to one of said resonators and a Q-switch mechanically coupled to said copper substrate to provide good thermal contact between the Q-switch and copper substrate, said copper substrate acting as a heat sink for said Q-switch.

13. In a Q-switched laser including a laser medium and a pair of resonators in combination therewith, the improvement comprising a substrate of a good thermal conducting material mechanically coupled to one of said resonators, a Q-switch mechanically coupled to said substrate to provide good thermal contact between the Q-switch and substrate, and means for cooling said substrate such that said substrate acts as a heat sink for such Q-switch.

* * * * *